June 12, 1923. 1,458,787
D. WALDEN
COMBINED AUTOMOBILE AND AEROPLANE
Filed Feb. 6, 1922  2 Sheets-Sheet 1
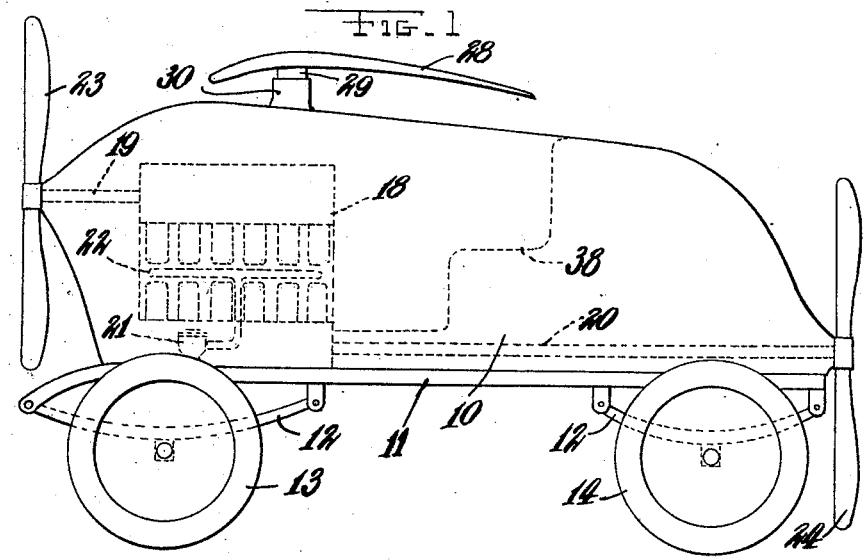
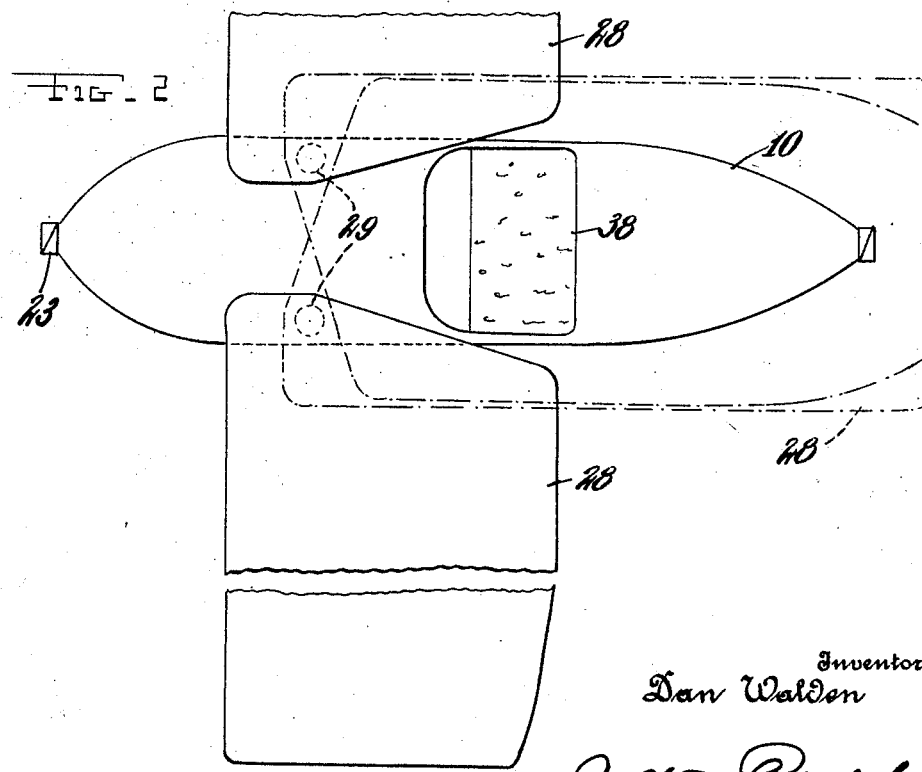
Inventor
Dan Walden
By
Attorney

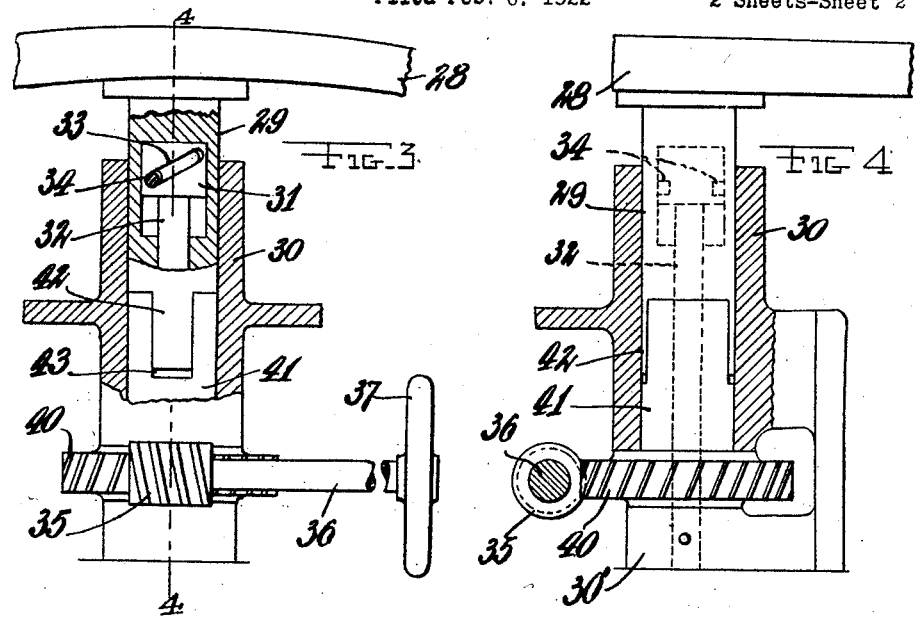
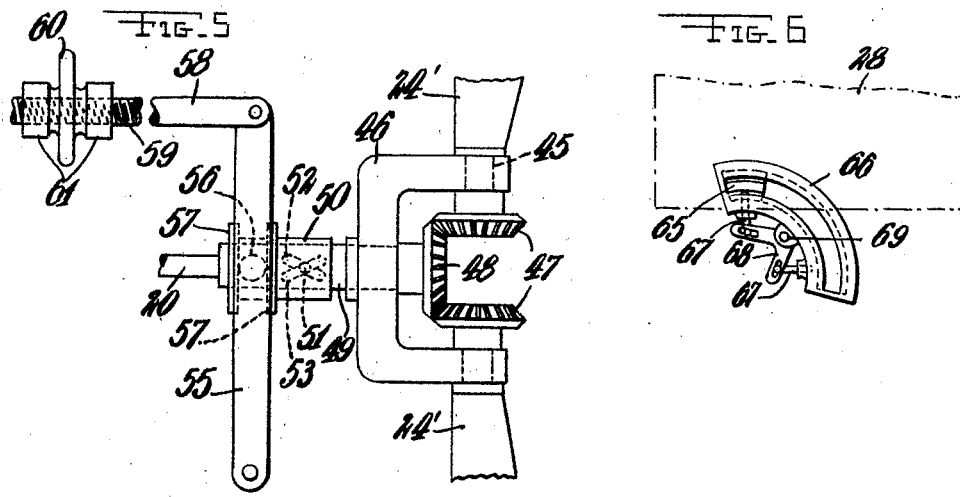

Patented June 12, 1923.

1,458,787

UNITED STATES PATENT OFFICE.

DAN WALDEN, OF SCALP LEVEL, PENNSYLVANIA.

COMBINED AUTOMOBILE AND AEROPLANE.

Application filed February 6, 1922. Serial No. 534,312.

*To all whom it may concern:*

Be it known that I, DAN WALDEN, subject of the King of Rumania, residing at Scalp Level, in the county of Cambria and State of Pennsylvania, have invented certain new and useful Improvements in Combined Automobiles and Aeroplanes, of which the following is a specification.

This invention relates to a combined automobile and aeroplane adapted for use either on land or in the air.

The invention has for a general object to provide a novel and improved vehicle of this type, other specific objects relating to the provision of foldable wings, and of an adjustable propeller mechanism whereby the direction of pull of the propeller may be reversed.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a combined automobile and aeroplane embodying the invention.

Fig. 2 is a plan view thereof, omitting the running gear.

Fig. 3 is an enlarged detail longitudinal vertical section showing the wing adjusting means.

Fig. 4 is a transverse section on the line 4—4 of Fig. 3.

Fig. 5 is a detail elevation showing the propeller adjusting means.

Fig. 6 is a detail view of a modified form of wing adjusting means.

In constructing my combined automobile and aeroplane I provide a body 10 which is preferably of substantially streamline form, being mounted on side frame members such as 11 which are supported, through the medium of springs 12, on front wheels 13 and rear wheels 14.

Within the body 10 I mount a gasoline engine 18 which preferably comprises two sets of cylinders arranged end to end in vertical alinement so as to drive an upper forwardly projecting shaft 19 and a lower rearwardly projecting shaft 20. The double engine may be supplied with fuel from a single carbureter 21 through a manifold pipe 22. Upon the front end of the upper shaft 19 is mounted a helical tractor propeller 23.

Upon the rear end of shaft 20 a second similar propeller 24 is mounted.

To support the machine in the air I provide a pair of wings 28 which are attached to the body 10 to be folded backward over the latter when the machine travels on land. In the arrangement shown in Fig. 4 each wing is fixed on a vertical sleeve 29 supported by a fixed bearing element 30 mounted in the body 10. This sleeve 29 encloses the enlarged upper end 31 of a post 32 whose lower end is fixed in a bottom part 30' of the bearing element 30. Formed in the post head 31 are a pair of inclined grooves such as 33 into which project studs 34 fixed in the sleeve 29. As will be apparent rotation of sleeve 29 will cause it to move vertically and carry the wing fixed thereon bodily up or down, the term bodily being here used to designate a common or equal movement of all parts of the wing, in contradistinction to a swinging movement around a centre. It will be understood that the grooves 33 for the respective posts will be so arranged that backward swinging of the wings will cause one to raise and the other to lower.

The sleeve 29 is adapted for operation by means of a worm pinion 35 fixed on a rearwardly extending shaft 36 provided with a hand-wheel 37 adjacent the driver's seat 38 (see Fig. 1) for turning purposes. Pinion 35 engages a worm gear 40 fixed on a second sleeve 41 engaged with the sleeve 29 by fingers such as 42 on the latter projecting into slots such as 43 in the former permitting axial movement of the upper sleeve.

As shown in Fig. 5 I may arrange the rear propeller 24 to have the angle of the blades adjustable, and to this end the blades indicated specifically at 24', are fixed on radial stub shafts 45 journaled in a U-bracket 46 and having bevel gears 47 on their inner ends meshing with a common bevel gear 48 fixed on a sleeve 49 freely surrounding the shaft 20 and swiveled in the bracket 46. A second sleeve 50 is loose on sleeve 49 and carries a pin 51 projecting inwardly into oppositively inclined grooves 52 and 53 and in the shaft 20 and inner sleeve 49. By longitudinally adjusting sleeve 50 the inner sleeve 49 is partially rotated on shaft 20, thus varying the angle of the propeller blades. Sleeve 50 may be moved longitudinally by means of a lever 55 carrying a pin 56 engaging between a pair of flanges 57 on the sleeve 50 and having connected thereto a forwardly extending rod 58 having a threaded portion 59 engaged by a hand-wheel 60 having an interiorly threaded hub and swiveled between two fixed members 61.

In Fig. 6 I have indicated a modified means whereby the wings 28 may be mounted for folding. In this arrangement the wing is fixed on a block 65 slidable in a fixed arcuate guide element 66, the guide elements for the respective wings being oppositely inclined so as to cause one wing to fold under the other. The wings may be locked in either position by means of bolts 67 engaged by a bell crank lever 68 fixed on a shaft 69 rotated by any suitable means.

It is believed that the manner of operation of my improved vehicle will be readily understood from the above description. By reversing the rear propeller blades the vehicle is assisted in raising in the air, while a braking action in descending may also be obtained. When the device is in use as an automobile the wings are folded to the position shown in Fig. 2. The shaft 20 may be provided with suitable transmission gearing of ordinary type for driving the rear wheels 14 when the machine is traveling on land.

Having thus described my invention what I claim as new and desire to protect by Letters Patent of the United States is as follows:

1. A machine of the class described comprising a body, a pair of wings pivoted to said body and extending oppositely therefrom and adapted to be folded backward thereover, and spiral guiding elements engaged with said wings whereby one is lowered bodily and the other raised bodily as they are folded backward.

2. In a machine of the class described, a wing, a post on which said wing is pivoted, means for swinging said wing on said post, and means for causing said wing to move vertically without changing its angle of incidence while swinging on the post.

3. A machine of the class described comprising a body, a pair of wings extending oppositely from said body, and means for folding said wings backward over said body, said means being adapted to impart relative vertical bodily movement to said wings as the latter are folded backward to permit of them being positioned one above the other.

4. In a machine of the class described, a wing, a sleeve on which said wing is fixed, a post surrounded by said sleeve, co-operating stud and spiral groove engaging means between said sleeve and post, and means for rotating said sleeve.

5. In a machine of the class described, a wing, a sleeve on which said wing is fixed, a post surrounded by said sleeve, co-operating stud and spiral groove engaging means between said sleeve and posts, and means for rotating said sleeve, said last means comprising a second sleeve surrounding said post and having non-rotative telescopic engagement with said first sleeve, a worm gear fixed on said second sleeve, and a worm pinion engaging said gear.

In testimony whereof I have affixed my signature.

DAN WALDEN.